June 19, 1945.　　　C. A. LEE　　　2,378,412
APPARATUS FOR HYDRODYNAMIC-TESTING OF SHIP MODELS
Filed Jan. 18, 1944
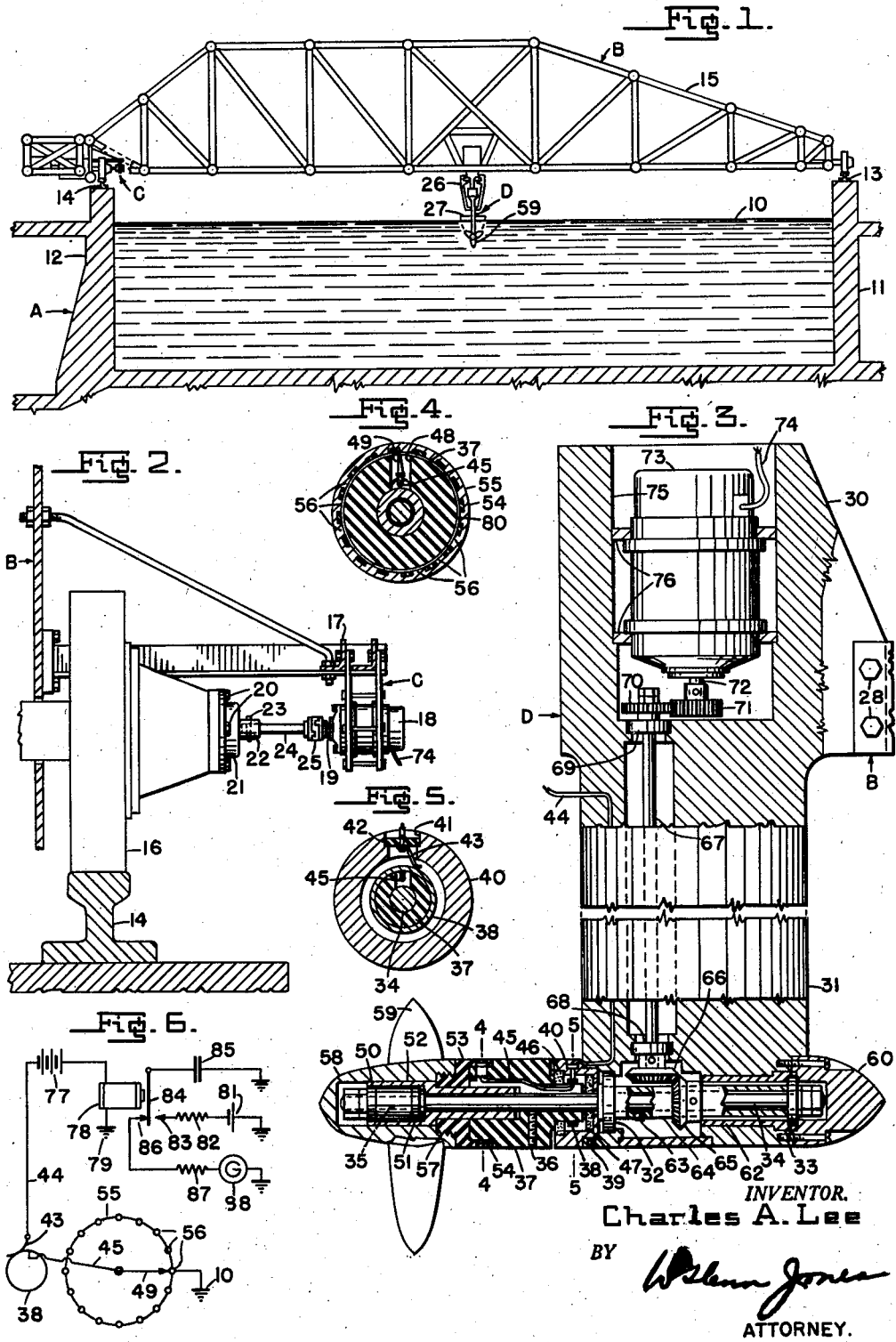
INVENTOR.
Charles A. Lee
BY
ATTORNEY.

Patented June 19, 1945

2,378,412

UNITED STATES PATENT OFFICE 2,378,412

APPARATUS FOR HYDRODYNAMIC-TESTING OF SHIP MODELS

Charles A. Lee, United States Navy, Laramie, Wyo.

Application January 18, 1944, Serial No. 518,779

7 Claims. (Cl. 73—148)

(Granted under the act of March 3, 1883, as amended April 30, 1928; 370 O. G. 757)

The invention relates to measuring and testing apparatus and to an improved fluid flow meter.

In the hydrodynamic testing of models of ships, boats and various nautical devices, the models are towed or guided along a predetermined course through normally still water in an elongate testing basin. Movement of the towed model through the normally still water tends to create a current therein which, however slight, may affect the accuracy of the results. An important object of the present invention is to provide, for use with a still-water testing basin equipped with a carriage for towing or guiding models along a predetermined course, apparatus for measuring any flow of water in the basin in the direction of said course and in a zone in the vicinity of the model being towed.

Another object of the invention is to provide a meter which will indicate small differences between the actual rate of movement of a fluid relative to a body, and a reference rate normally closely approximating the actual rate.

A further object is the provision of a fluid flow meter for attachment to a land vehicle and which will positively indicate any slight movement, with respect to the ground and in the direction of travel of the vehicle, or fluid in the vicinity of the vehicle.

Other objects and advantages of the invention will become apparent during the course of the following detailed description, taken in connection with the accompanying drawing, forming a part of this specification, and in which drawing, Figure 1 is a view, partly in vertical transverse section and partly in front elevation, of a still-water testing basin provided with a model towing carriage equipped with my fluid flow meter, a small portion of the starboard side of the carriage being broken away to illustrate the arrangement of parts.

Figure 2 is a view, partly in vertical transverse section and partly in front elevation, of the right front wheel of the carriage and its associated parts.

Figure 3 is a view, partly in vertical longitudinal section and partly in side elevation, of the fluid operated propeller and its bracket.

Figures 4 and 5 are transverse sectional detail views substantially on the lines 4—4 and 5—5, respectively, in Figure 3.

Figure 6 is a diagrammatic view of a measuring circuit preferably forming a part of the apparatus.

In the drawing, which for the purpose of illustration shows only a preferred embodiment of the invention, and where similar reference characters denote corresponding parts throughout the several views, the letter A designates a still-water testing basin provided with a model towing carriage B equipped with power take-off mechanism C and a fluid flow meter assembly D.

The testing basin A preferably is a long, narrow, rectangular, open structure containing water 10 and including longitudinal sidewalls 11, 12 which horizontally support a pair of spaced parallel rails 13, 14 forming a track. Transversely spanning the testing basin A and movable longitudinally thereof on the rails 13, 14, is the wheeled carriage B which, in the example shown, is made of welded steel tubing 15 in the form of a bridge. Attached to the starboard side of the carriage B adjacent one right wheel 16 is the power take-off assembly C. This includes a suitable bracket 17 arranged to support an auto synchronous generator 18 with its shaft 19 in coaxial alignment with the wheel 16. Attached to the hub of the wheel 16, as by bolts 20, is a hub cap 21 including an axial stub 22 connected, as by a pin 23, to one end of a power take-off shaft 24. At its opposite end, this shaft 24 is connected, as by a suitable flexible coupling 25 to the generator shaft 19.

Attached to the carriage B, preferably at the middle thereof, as by suitable mechanism including a downwardly extending bracket 26, is the model 27 to be tested. Fixed to the carriage, preferably forwardly of the bracket 26, as by bolts 28, is the downwardly extending fluid flow meter assembly D, shown more specifically in Figure 3. The carriage, in moving along the rails 13, 14 will tow the assembly D and the model 27, along a rectilinear course longitudinally of the testing basin A.

The fluid flow meter assembly D includes a housing 30 having a submerged hydrofoil portion 31 so streamlined that it may be towed through the water 10 without causing appreciable disturbance thereto. Supported for rotation in the submerged portion 31 about an axis extending in the direction of travel of the carriage, as by anti-friction bearings 32, 33, is a shaft 34 having a forwardly projecting end portion 35. Fixed on the shaft 34, as by a set screw 36, is a cylindrical member 37, formed of an electrically insulative material, and encircled at its reduced rear end with an electrically conductive ring 38. Fixed to the leading edge of the hydrofoil portion 31, as by a set screw 39, and in spaced encircling relation to the conducting ring 38, is a sleeve 40 provided with a radial opening 41 accommodating an electrically insulative support 42, as shown more specifically in Figure 5. This support carries a brush 43 slidably contacting the ring 38 for transmitting current between conductors 44, 45 carried by the housing 30 and the rotary cylindrical member 37, respectively. Suitable packings 46, 47, may be inserted in the sleeve 40 to seal the housing against water. Formed in the reduced forward end of the cylindrical member 37, as shown in Figure 4, is a radial opening 8 containing a brush-like contact 49 connected to the conductor 45.

Supported for rotation on the shaft 34 at its forward end portion 35, as by anti-friction bearings 50, 51, is a sleeve 52 having a reduced rear end portion on which is pressed or otherwise fastened a cylindrical member 53 formed of electrically insulative material. This member 53 includes an annular flange 54 encircling the member 37 at its reduced forward end. Embedded in the flange 54 is an electrically conductive ring 55 provided with a circular series of internally exposed contacts 56 successively cooperable with the brush-like contact 49 upon relative movement of the cylindrical members to periodically establish electrical connection between the conductor 45 and the water 10 surrounding the ring 55.

The member 53 includes a reduced forward end 57 in internal screw-threaded engagement with the faired hub 58 of a screw propeller 59 arranged to rotate at a rate depending on the rate of movement of the carriage relative to the water, in the basin. At its trailing end, the hydrofoil 31 may be provided with a removable faired cap 60 enclosing the rear end of the shaft 34. Inwardly of the cap 60, a removable bushing 62 is provided to facilitate the assembly and dismantling of parts.

Fixed on the shaft 34, as by a set screw 63, is a sleeve 64 to which is rigidly fastened a bevel gear 65. Meshing with the gear 65 is another bevel gear 66 rigidly fixed on the lower end of a shaft 67 which extends upwardly through the housing 30. This shaft 67 is supported for rotation, as by anti-friction bearings 68, 69. Fixed to the upper end of the shaft 67 is a spur gear 70 meshing with another spur gear 71. This gear 71 is fastened to the shaft 72 of an autosynchronous motor 73, electrically connected, as by a conductor cable 74, to the generator 18 for synchronous rotation therewith. The motor 73 may be rigidly supported in a suitable chamber 75 in the upper end of the housing 30, as by spaced rings 76.

In Figure 6 is shown a tachometer circuit for measuring the rate of movement of the previously-mentioned ring 55 relative to the brush-like contact 49. Serially connected to the ring 55, brush-like contact 49, conductor 45, slip ring 38, brush 43, and conductor 44, all previously-described, are a direct current source 77 and an electromagnetic relay 78, grounded at 79. The ring 55 is of course grounded by the basin water 10. In order to reduce friction between the relatively movable members 37, 53, as well as between the contacts 49, 56, a small clearance may be provided therebetween. Thus, some water may find its way into the annular space 80 shown in Figure 4. As the brush-like contact 49 passes each ring contact 56, the water gap therebetween varies whereby an impulse is produced sufficient to energize the relay 78. The means for measuring the frequency of operation of the electromagnetic relay 78 may be similar to that disclosed in U. S. Patent No. 1,611,224, granted to Nyquist. A normally closed condenser-charging circuit including a source of current 81, resistor 82, relay contact 83, armature 84 and condenser 85 is provided. When an impulse is received by the relay, the condenser 85 is discharged through the armature 84, another relay contact 86, resistor 87 and a galvanometer 88. Since each cycle of movement of the relay armature 84 discharges a definite quantity of electricity from the condenser 85 through the meter 88, the frequency of vibration of the relay armature will be indicated by the amount of current passing through the meter.

In the operation of the fluid flow measuring apparatus, the model 27 is towed or guided by the carriage B at any desired speed. Rotary motion of the carriage wheel 16 is transmitted to the cylindrical member 37 through the power take-off shaft 24, coupling 25, generator 18, conductor cable 74, synchronous motor 73, spur gears 71, 70, shaft 67, bevel gears 66, 65, sleeve 64, and shaft 34. Rotary motion of the propeller 59 is transmitted to the cylindrical member 53 by the screw-threaded connection at the propeller hub. The propeller 59 should be designed to make one rotation during travel through still water over a distance substantially equal to the circumference of the carriage wheel 16. With this arrangement, the members 37, 53, will tend to rotate in synchronism during forward travel of the carriage B along the testing basin A when the water 10 therein is motionless. Under these conditions, no current will flow in the galvanometer circuit and the galvanometer reading will be zero. On the other hand, any movement of water in the basin in the direction of travel of the carriage B caused, for instance, by movement of the model 27 through the water, will vary the propeller speed for a given carriage speed and cause relative rotation of the members 53, 37, at a rate which will be indicated by galvanometer 88.

Various changes may be made in the form of invention herein shown and described, without departing from the spirit of the invention or the scope of the following claims.

The invention described herein may be manufactured and used by or for the Government of the United States of America for governmental purposes without the payment of any royalties thereon or therefor.

I claim:

1. Apparatus for use with a still-water testing basin comprising a carriage for towing objects such as ship models along a predetermined course through the water in such a basin, means for measuring any movement of water in the basin in the direction of said course and in the vicinity of the towed object, said means comprising a circuit including a source of electric current, a switch including two relatively movable contact members, and a meter measuring the frequency of operation of the switch, means for imparting movement to one of said contact members at a rate depending on the rate of movement of the carriage relative to the water, and means for imparting movement to the other of said contact members at a rate depending on the rate of movement of the carriage relative to the basin.

2. Apparatus for use with a still-water testing basin comprising a carriage for towing objects such as ship models along a predetermined course through the water in such a basin, means for measuring any movement of water in the basin in the direction of said course and in the vicinity of the towed object, said means comprising a shaft supported by the carriage for rotation about an axis extending in the direction of said course, a propeller freely rotatable on the shaft and at a rate depending on the rate of movement of the carriage relative to the water, means for rotating the shaft at a rate depending on the rate of movement of the carriage relative to the basin, and means for measuring the rate of rotation of the propeller relative to the shaft.

3. Apparatus for use with a still-water testing basin comprising a wheeled carriage for towing models along a predetermined course through the water in such a basin, means for measuring any movement of water in the basin in the direction of said course and in the vicinity of the model being towed, said means including a shaft supported by the carriage for rotation about an axis extending in the direction of said course, a propeller mounted for rotation relative to the shaft, means transmitting motion from a wheel of the carriage to the shaft, and a tachometer for measuring the rate of rotation of the propeller relative to the shaft.

4. The combination with a land vehicle movable along a selected path of travel relative to a fluid, of apparatus for measuring the ground speed of the fluid in the direction of said path, including a shaft supported by the vehicle for rotation about an axis extending in the direction of said path, a propeller freely rotatable on the shaft and operating in said fluid, means for rotating the shaft at a rate depending on the ground speed of the vehicle, and means for measuring the rate of rotation of the propeller relative to the shaft.

5. The combination with a wheeled vehicle movable along a selected path of travel relative to a fluid, of apparatus for measuring the ground speed of the fluid in the direction of said path, and in the vicinity of the vehicle, comprising a shaft rotatably supported by the vehicle, a propeller rotatable on the shaft and operating in said fluid, means transmitting motion from a wheel of the vehicle to the shaft, and a tachometer for measuring the rate of rotation of the propeller relative to the shaft.

6. For use with a wheeled vehicle movable along a selected path of travel relative to a fluid, apparatus for measuring the ground speed of the fluid in the direction of said path, in a zone fixed with respect to the vehicle, comprising a shaft rotatably supported by the vehicle, a propeller rotatable on the shaft and operating in said fluid, means transmitting motion from a wheel of the vehicle to the shaft including an autosynchronous motor driving the shaft and a generator driven by the wheel, and a tachometer for measuring the rate of rotation of the propeller relative to the shaft.

7. In a fluid flow meter, a support, a shaft mounted for rotation relative to the support, a propeller freely rotatable on the shaft, means for rotating the shaft at a known rate normally closely approximating the rate of rotation of the propeller in the fluid during relative flow of said fluid in a given direction with respect to said support, and means for measuring the rate of rotation of the propeller relative to the shaft comprising an electric circuit including a conductor carried by the support, a conductor carried by the shaft, a sliding connection between said conductors, and a circuit maker and breaker having two relatively movable contacts, one connected to the shaft conductor and rotatable with the shaft and the other rotatably carried by the propeller.

CHARLES A. LEE.